Feb. 16, 1954 — J. W. CLERKE — 2,669,468
THREADED JOINT AND ELEMENT THEREOF HAVING IMPROVED THREAD FORM
Filed Dec. 5, 1950 — 3 Sheets-Sheet 1
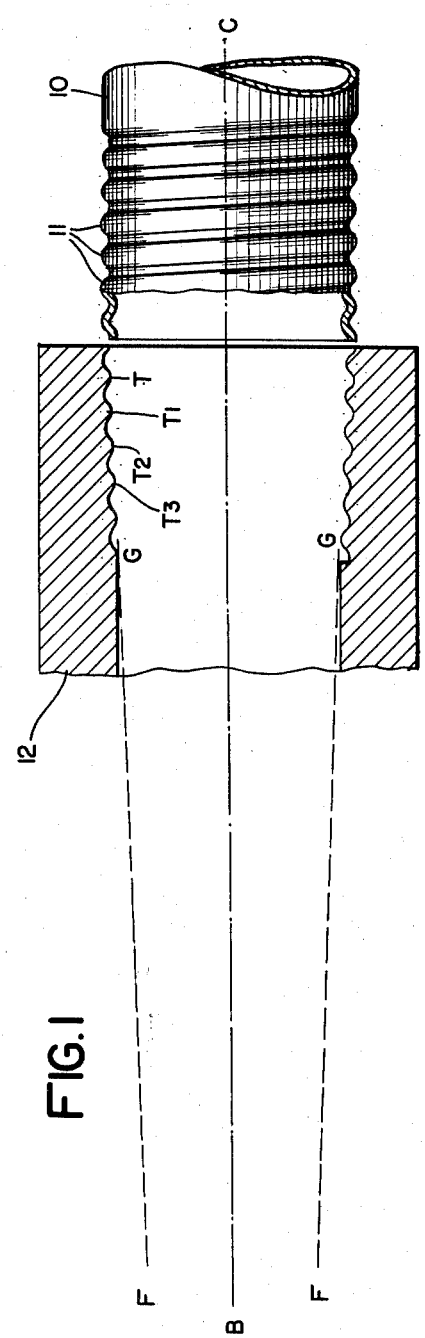
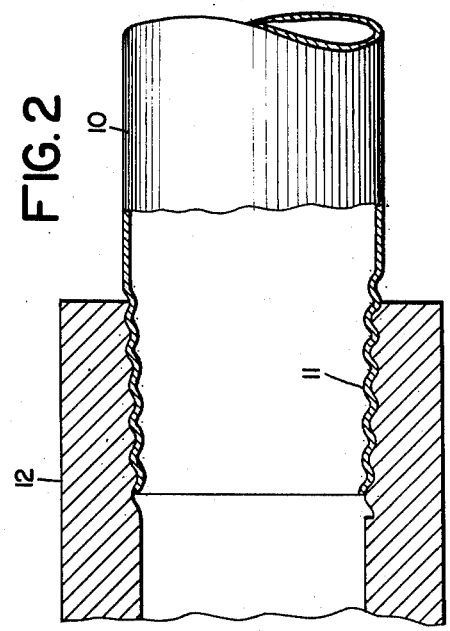
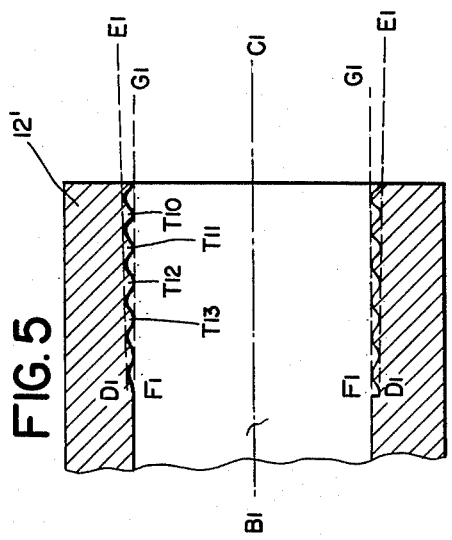
INVENTOR.
JOHN W. CLERKE
BY
ATTORNEY.

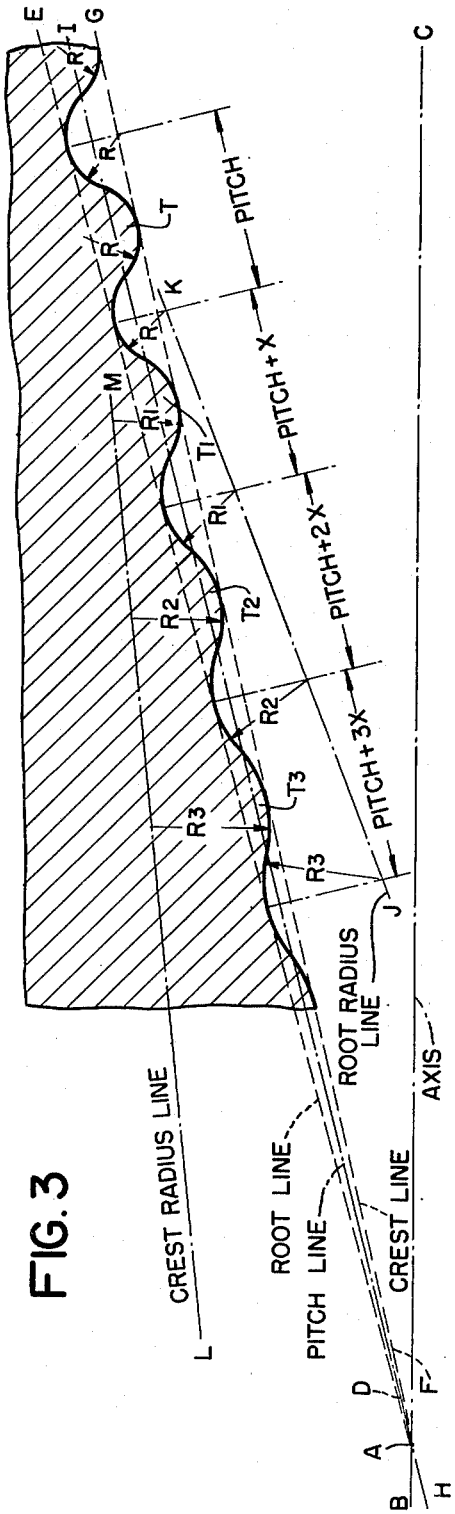
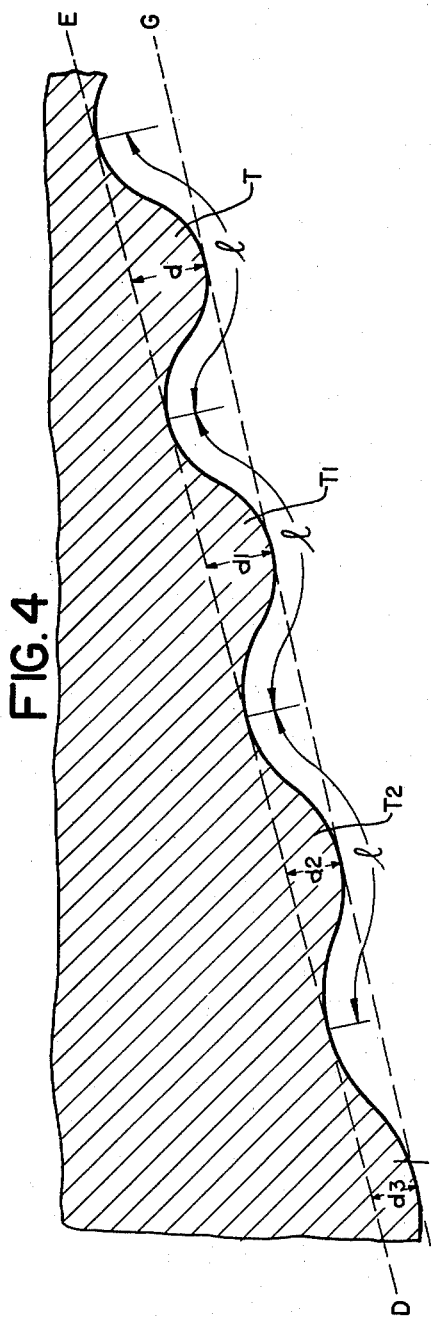
INVENTOR.
JOHN W. CLERKE

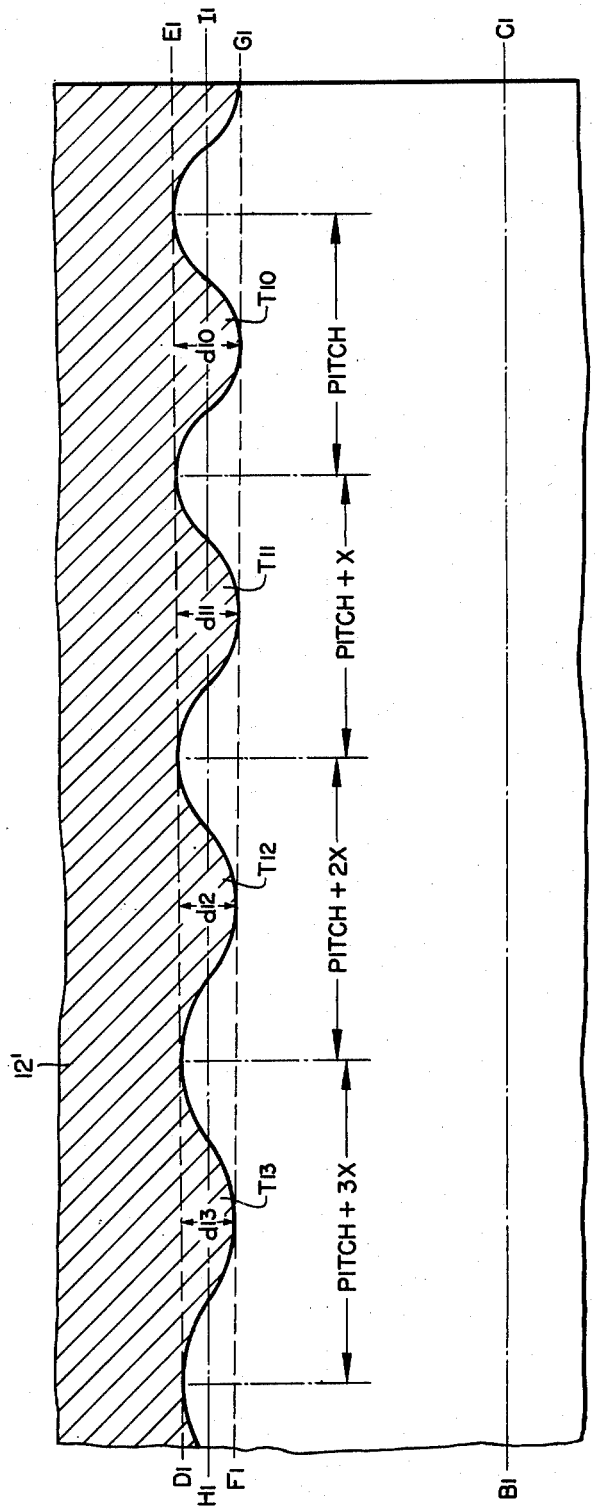

Patented Feb. 16, 1954

2,669,468

UNITED STATES PATENT OFFICE 2,669,468

THREADED JOINT AND ELEMENT THEREOF HAVING IMPROVED THREAD FORM

John W. Clerke, Little Falls, N. J.

Application December 5, 1950, Serial No. 199,288

12 Claims. (Cl. 285—145)

This invention relates to threaded joints and to elements of such joints having improved thread forms. The invention pertains, in one of its more specific aspects, to a female member that is adapted to threadedly interengage a tubular male member whereby to provide a joint that effectively seals against leakage and that is capable of withstanding working pressures up to the bursting point of the male member.

In the construction of fluid conveying systems that comprise threaded pipe and fittings, it has been the practice generally to use heavy wall pipe. Despite the fact that the fluid pressures developed in such systems could be safely carried by relatively light gauge pipe, it has usually been necessary to employ pipe having walls of sufficient thickness to permit the cutting of threads conforming to the standards in the industry. Thus, it is apparent that the principal reason for using heavy pipe has been to provide sufficient stock to permit cutting of the selected thread, while retaining sufficient strength to withstand encountered pressures in the region of the cut thread sections.

By eliminating cut threads in the pipe and providing suitable threaded joint means interconnectable with the pipe, the primary factor in selecting thickness or weight of pipe would be the operating pressures to which the pipe would be subjected.

The economic benefits obtained by using light gauge pipe and tubing are offset by the fact that the walls of such pipe and tubing are too thin to have threads cut into their ends as is done with conventional heavy gauge pipes. While light gauge pipes may be joined to fittings by various procedures, such as soldering, brazing, swaging and the like, these procedures all have inherent disadvantages as compared to the simplicity of a threaded joint of the character used in heavy walled pipe systems.

There have been several worthwhile advances in the art of providing threads in thin-walled pipe and tubing in recent years. For one thing, it has been determined that by rolling thread on the end of a light gauge pipe, as disclosed in my pending applications Serial No. 158,644, entitled "Thread-Rolling Apparatus," and Serial No. 158,645, entitled "Tube-Swaging and Thread-Rolling Apparatus," there is no loss of pipe metal, as in the case of cut threads. Further, such rolling does not adversely affect the mechanical properties of the pipe section. If anything, the cold working of the metal of the pipe by rolling improves its mechanical properties. For these reasons, it is recommended that pipe used in joints in accordance with this invention have rolled threads formed thereon.

A light gauge pipe having rolled threads formed thereon, also referred to herein as a "male member," is adapted to threadedly interengage with a socket or female member having threads formed therein in accordance with this invention, whereby such threaded interengagement effects a fluid-tight sealing joint between the male and the female members. To effect such a joint, the threads in the female member are so formed that they reshape or reform the threads on the male member as one of the members is turned and advanced with respect to the other member, whereby the outer surface of the engaging threads in the male member become shaped or contoured to conform with the engaging threads of the female member. This reshaping or reforming is all accomplished within the elastic limits of the material of which the male member is made. The configuration of the threads of the female member remains substantially unchanged.

When conventional and relatively heavy gauge threaded pipe and sockets or other fittings are used, the sealing effect is attained by developing an "interference fit" between interengaging thread elements. In interference fits, the thread elements are crushed and permanently deformed in an attempt to fill interstices between the threads with the metal of the threads by what is termed plastic flow. No such crushing takes place in making joints in accordance with my invention since the threads of the male member are merely reshaped by bending and squeezing so as to conform with the shape of the threads in the female member. The threads in the female member are substantially unaffected by such reshaping of the male member threads.

In conventional threaded joints, sealing engagement between the male and female members is caused, at least in part, by forcing the metal of the threads in both members to fail in compression and to be displaced by plastic flow into the spaces between mating threads. Upon the disengagement of the male member from the female member there is very little, if any, recovery of the displaced metal in the threads of either member to its original form for the reason that the metal has acquired a permanent set as a result of making the joint.

Such is not the case as regards the joints of this invention. The metal of the male member in my joints is merely reshaped and bent or squeezed to fill the spaces between mating threads. Inasmuch as this is accomplished below the yield point or elastic limit of the metal of the male member, the threads on the male member return to their original form when the joint is broken by disengaging the male member from the female member.

Experience has demonstrated that it is not possible to make and break a conventional threaded joint many times and still obtain an effective seal. This is due to the fact that the size and configuration of the threads are altered each time the joint is made due to molecular compression and displacement of the metal of the threads. Such is not the case with my joints for the reason that the threads in the female member retain their original shape at all times, and the threads on the male member return to their original shape each time the members are disengaged. With conventional thread joints there is considerable cold working of the metal in the threaded sections. This is highly undesirable in some metals as it may reduce the resistance thereof to corrosion. Cold working is minimized in making joints in accordance with my invention, thereby correspondingly minimizing the dangers to corrosion in the joint.

As is well known to the art, sealing may occur anywhere along a conventional threaded joint. Theoretically, this sealing may take place at either end of the interengaging threaded portions of the joint members or at some region intermediate the ends. It has been determined that such sealing usually takes place at the mouth of the female member. This is undesirable as it results in minimizing the sealing effect. With my threaded joints, sealing takes place over substantially the entire run of interengaging threads as will be apparent to persons skilled in the art from a consideration of the detailed description that follows, taken in conjunction with the accompanying drawings.

It is a primary object of the invention to provide threaded joints having improved characteristics.

Another object of the invention is to provide a threaded joint comprising a threaded tubular male member and a threaded female member, which members are adapted to be readily interengaged to obtain an effective seal with a minimum of applied force.

Another object of the invention is to provide, in a pipe system for conveying fluid under pressure, a threaded joint capable of withstanding, without leakage, fluid pressures up to the bursting point of the pipe.

Another object of the invention is to provide threadedly interengageable metallic tubular male and female members that are adapted to be made up into a fluid-tight joint with a minimum of cold working and without displacement by plastic flow of the metal in the threads of the members.

The invention has for another object the provision of a threaded joint that is capable of being alternately made up and broken, many more times than has been practical with ordinary threaded joints, without adversely affecting the efficiency of the seal obtainable thereby.

A further object of the invention is to provide, in a female member, threads having an improved form, whereby to receive and develop a fluid-tight seal with rolled threads on a relatively light gauge tubular male member.

To the end that the foregoing objects may be attained, a preferred and recommended threaded joint constructed in accordance with the invention comprises threadedly interengageable tubular male and female members. The male member is made up of a suitable relatively light gauge resilient metal, such as stainless steel, and has a series of substantially identical constant pitch threads rolled on at least one end. The female member may be in the nature of a socket and is made of heavy gauge or thick-walled metal as compared to the male member. Formed in the female member is a series of tapered threads that are undulating in longitudinal contour length. Successive threads in the female member increase in pitch and decrease in depth, such increase and decrease being preferably uniform or constant. Both the crests and the roots of the threads in the female member are elements of surfaces of revolution of corresponding right circular cones that are coaxial. Such cones may have a common apex or the corresponding apices may be spaced apart along the coincident axes.

The first of said series of threads in the female member is preferably the same as the threads on the male member for ready reception of the free end thread on the male member. As one of the members is turned and advanced relative to the other member, the threads of the male member, by virtue of their being thin in cross-section and flexible, are successively reshaped and bent or squeezed to conform with the configuration of mating threads in the female member. The threads in the female member remain substantially unchanged. The reshaping and bending of the male member threads is accomplished within the elastic limits of the metal of the male member. The resultant joint is fluid-tight over substantially the entire run of mating threads.

The joint may be readily broken without damage to the parts by merely turning one of the members relative to the other member to effect disengagement therebetween. In the course of disengaging members the threads on the male member, due to their resilience, return to their original shape and are ready to be reengaged with the female member or another female member having similar characteristics.

It is within the purview of the invention to so form the threads in the female member that the crests thereof are elements of the surface of revolution of a right circular cylinder instead of elements of the surface of revolution of a right circular cone. The characteristics of the threads in the female member may otherwise be the same as those outlined above. Further, the axis of the right circular cylinder is coincident with the axis of revolution of the right circular cone referred to earlier with regard to the roots of the threads in the female member.

The enumerated objects, together with additional objects, as well as the advantages attainable by the practice of this invention will be readily understood by persons skilled in the art upon reference to the following detailed description and the accompanying drawings which respectively describe and illustrate threaded joints constructed in accordance with the invention.

In the drawings, wherein like reference characters denote corresponding parts throughout the several views:

Figure 1 is a view in side elevation, partly in central longitudinal cross-section, of separated male and female members embodying the invention;

Figure 2 corresponds to Figure 1 and shows the members in threaded engagement;

Figure 3 is a fragmentary view of Figure 1, greatly enlarged and distorted for purposes of illustration;

Figure 4 is an enlarged view of Figure 3;

Figure 5 is a central longitudinal cross-sectional view of a modified form of threaded female member, and Figure 6 is an enlarged fragmentary view of Figure 5 and corresponds generally to Figure 3.

Referring now to Figure 1, I have illustrated therein a tubular male member 10 made of a light-gauge resilient metal, such as stainless steel, and having a series of substantially identical constant pitch threads 11 rolled on one end. Threads 11 are adapted to engage and form a fluid-tight seal with corresponding threads formed in a thick-walled socket or female member 12.

The threads in the female member are tapered and variable and will now be described, having reference to Figures 1, 3 and 4. The longitudinal axis or center line of the thread-defining opening in the female member is denoted by line BC. Successive threads are indicated at T, T₁, T₂ and T₃. These threads, as illustrated, are undulating in longitudinal sectional configuration and are so formed that the roots thereof are elements of the surface of revolution of a right circular cone, the axis of which lies along line BC. The root line of these threads is represented by line DE. The crests of threads T, T₁, T₂ and T₃ are also elements of the surface of revolution of a right circular cone having an axis coincident with line BC. The crest line of these threads is represented by line FG. The pitch line of the threads is indicated by line HI and lies on the surface of revolution of a right circular cone also having its axis along line BC. As shown on Figure 3, the referred to right circular cones may have a common apex A that lies on line BC.

The illustrated series of threads in the female member vary uniformly in pitch. As indicated in Figure 3, the pitch of thread $T_1$ is equal to the pitch of thread T plus an increment X; the pitch of thread $T_2$ equals the pitch of thread T plus two times increment X, while the pitch of thread $T_3$ is equal to the pitch of thread T plus three times increment X. The value of pitch increment X depends on various factors including the material, gauge and diameter of male member 10; and the pitch and depth of threads 11 of the male member.

The depths of threads T, $T_1$, $T_2$ and $T_3$ are indicated by letters $d$, $d_1$, $d_2$ and $d_3$ respectively. As shown in Figure 4, these thread depths decrease uniformly for successive teeth of the series.

Preferably, and for the purposes of simplicity, the longitudinal contours of successive female threads are formed by circular arcs inscribed by radii centered at the intersections of root and crest radius lines JK and LM, respectively, with lines normal to pitch line HI, and that respectively extend through the roots and crests of the threads. Thus, R, $R_1$, $R_2$ and $R_3$ denote the radii of the circular arcs that form threads T, $T_1$, $T_2$ and $T_3$ respectively. The threads of the female member are substantially equal in longitudinal contour length as represented by $l$ in Figure 4.

In making up a joint with members 10 and 12, the parts are first disposed in the relative position shown in Figure 1 and next brought together so that the free end thread of member 10 abuts thread T of member 12. One of the members is then rotated with respect to the other member in a direction to effect mating engagement between the abutting threads. Initial mating engagement may be accomplished manually, assuming that the parts are of such size and weight as to permit of manual actuation. Subsequent turning is usually performed with the aid of wrenches or other suitable tools. As one of the members, let us say male member 10, is turned and advanced relative to member 12, the threads of member 10, as they successively engage threads $T_1$, $T_2$ and $T_3$ of member 12, are reshaped and bent or squeezed so as to conform in configuration with the contours of corresponding mating threads in the female member, as indicated in Figure 2. This results in a close, intimate fit between the mating threads and effects a fluid-tight seal against leakage over substantially the entire run of interengaging threads.

The joint may be readily broken by turning one of the members relative to the other member in a direction to cause withdrawal of the male member from the female member. In the course of such withdrawal, the engaging threads of the male member, due to the resilience of the metal thereof, are reshaped, and upon complete withdrawal of the male member from the female member, all threads in the male member will have returned to their original size and shape, as illustrated in Figure 1.

The modification of the invention shown in Figures 5 and 6 is the same in many respects to the embodiment of the invention shown in Figures 1 through 4. In the modification, the female member, indicated by numeral 12', is adapted to threadedly interengage with male member 10 of Figure 1 and is provided with a series of variable threads $T_{10}$, $T_{11}$, $T_{12}$ and $T_{13}$. The center line or axis of the thread-defining opening in member 12' is indicated by line $B_1C_1$, the thread crest line by line $F_1G_1$, the pitch line by line $H_1I_1$, and the thread root line by $D_1E_1$. As in the case of the earlier described embodiment, the roots of threads $T_{10}$ through $T_{13}$ are elements of the surface of revolution of a right circular cone coaxial with center line $B_1C_1$. The crests of these threads are, however, elements of the surface of revolution of a right circular cylinder coaxial with center line $B_1C_1$. Successive threads of the modification increase uniformly in pitch and decrease uniformly in depth, as indicated at $d_{10}$ through $d_{13}$, in the same manner as earlier described. Furthermore, these threads are substantially equal in longitudinal contour length.

In making up a joint consisting of female member 12' (Figure 5) and male member 10 (Figure 1), the parts are brought together, turned and advanced relative to each other, as outlined earlier in connection with the embodiment of the invention shown in Figure 1. This causes threads in the male member to engage threads in the female member and be reshaped and bent so as to conform with the contours of corresponding mating threads in the female member. Such reshaping and bending are developed within the elastic limit of the material of the male member and here again results in a fluid-tight seal along substantially the entire run of mating threads. Further, the threads in the male member will, upon disengagement from the female member, reassume their original size and shape and be in condition for reinsertion in the female member at such time as it may be desired to again make up the joint.

From the foregoing it is believed that the construction, operation and advantages of my present invention will be readily comprehended by persons skilled in the art. It is to be clearly understood, however, that the forms of my invention herewith shown and described are to be taken as preferred examples of the same and that various changes may be resorted to without departing from the spirit of the invention as defined by the appended claims.

I claim:

1. Threadedly interengageable tubular male and female members, said male member being thin-walled and resilient as compared to said female member and having substantially constant pitch, sinuously configured threads of substantially uniform diameter formed on an end portion thereof, said female member having similar threads formed therein, successive threads in the female member increasing in pitch and decreasing in depth, at least the roots of the threads in the female member being outwardly flared and elements of the surface of revolution of a right circular cone.

2. Threadedly interengageable tubular male and female members in accordance with claim 1, wherein the successive threads in the female member increase uniformly in pitch and decrease uniformly in depth.

3. Threadedly interengageable tubular male and female members in accordance with claim 2, wherein the threads in the female member are undulating in longitudinal cross-sectional configuration and substantially equal in longitudinal contour length.

4. Threadedly interengageable tubular male and female members, said male member being thin-walled and resilient as compared to said female member and having substantially constant pitch, sinuously configured threads of substantially uniform diameter formed on an end portion thereof, said female member being outwardly flared and having similar threads formed therein, successive threads in the female member increasing in pitch and decreasing in depth, the crests and the roots of the threads in the female member being elements of the surfaces of revolution of right circular cones having a common axis.

5. Threadedly interengageable tubular male and female members in accordance with claim 4, wherein the successive threads in the female member increase uniformly in pitch and decrease uniformly in depth.

6. Threadedly interengageable tubular male and female members in accordance with claim 5, wherein the threads in the female member are undulating in longitudinal cross-sectional configuration and substantially equal in longitudinal contour length.

7. Threadedly interengageable tubular male and female members, said male member being thin-walled and resilient as compared to said female member and having substantially constant pitch, sinuously configured threads of substantially uniform diameter formed on an end portion thereof, said female member having similar threads formed therein, successive threads in the female member increasing in pitch and decreasing in depth, the roots of the threads in the female member being elements of the surface of revolution of a right circular cone and outwardly flared, the crests of the threads in the female member being elements of the surface of revolution of a right circular cylinder, said cone and cylinder being coaxial.

8. Threadedly interengageable tubular male and female members in accordance with claim 7, wherein the successive threads in the female member increase uniformly in pitch and decrease uniformly in depth.

9. Threadedly interengageable tubular male and female members in accordance with claim 8, wherein the threads in the female member are undulating in longitudinal cross sectional configuration and substantially equal in longitudinal contour length.

10. A female member that is adapted to effect threaded sealing engagement with a tubular male element, said member being tubular and having formed therein a series of threads that are undulating in longitudinal cross-sectional configuration and that are substantially equal in longitudinal contour length, said threads successively increasing in pitch and decreasing in depth, at least the roots of said threads being elements of the surface of revolution of a right circular cone and outwardly flared.

11. A female member in accordance with claim 10, wherein the crests of said threads are elements of the surface of revolution of another right circular cone that is coaxial with said cone.

12. A female member in accordance with claim 10, wherein the crests of said threads are elements of the surface of revolution of a right circular cylinder that is coaxial with said cone.

JOHN W. CLERKE.

References Cited in the file of this patent

UNITED STATES PATENTS

| Number | Name | Date |
| --- | --- | --- |
| 197,467 | Harvey | Nov. 27, 1877 |
| 597,000 | Higbee | Jan. 11, 1898 |
| 720,578 | Greenfield | Feb. 17, 1903 |
| 1,367,168 | Stanford | Feb. 1, 1921 |
| 1,388,622 | Voorhees | Aug. 23, 1921 |
| 1,394,791 | Runyan | Oct. 25, 1921 |
| 2,042,467 | Hothersall | June 2, 1936 |
| 2,245,419 | Unke | June 10, 1941 |
| 2,476,656 | Galbraith | July 19, 1949 |